United States Patent
Roux

(10) Patent No.: US 6,636,494 B1
(45) Date of Patent: Oct. 21, 2003

(54) METHOD OF RESOLVING PHYSICAL LAYER COLLISIONS IN A RANDOM ACCESS PROTOCOL AN A CORRESPONDING RECEIVER

(75) Inventor: Pierre Roux, Argenteuil (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/363,848

(22) Filed: Jul. 30, 1999

(30) Foreign Application Priority Data

Jul. 2, 1999 (EP) .......................................... 99440173

(51) Int. Cl.⁷ ................................................ H04Q 7/00
(52) U.S. Cl. ........................ 370/333; 370/348; 370/447
(58) Field of Search ................................ 370/333, 335, 370/340, 342, 338, 349, 441, 447, 348; 375/148, 347, 267

(56) References Cited

U.S. PATENT DOCUMENTS

| | | | | |
|---|---|---|---|---|
| 5,673,252 A | * | 9/1997 | Johnson et al. | 370/449 |
| 5,818,826 A | * | 10/1998 | Gfeller et al. | 370/342 |
| 5,856,971 A | * | 1/1999 | Gitlin et al. | 370/335 |
| 6,181,683 B1 | * | 1/2001 | Chevillat et al. | 370/329 |
| 6,269,088 B1 | * | 7/2001 | Masui et al. | 370/335 |
| 2002/0061050 A1 | * | 5/2002 | Ozluturk | 375/141 |
| 2002/0071411 A1 | * | 6/2002 | Masui | 370/335 |

OTHER PUBLICATIONS

Zorzi, M.: "Mobile Radio Slotted Aloha with Capture and Diversity" Wireless Networks, US, ACM, vol. 1m, No. 2, pp. 227–239 XP000524646 ISSN: 1022–0038.

Kane, Jr. R. E. et al.: "Performance of a Rake Demodulator with Pre–Decision Multipath Thresholding" Proceedings of the Military Communications Conference (Milcom), US, New York, IEEE, vol. –, pp. 1025–1029 XP000222000.

Chen, X. et al.: "New Collision–Channel Model for Packet–Switched CDMA Networks" Electronics Letters, GB, IEE Stevenage, col. 27, No. 20, pp. 1792–1793 XP000264339 ISSN. 0013–5194.

Ramabadran, T. V. et al.: "A Tutorial on CRC Computations" IEEE Micro, US, IEEE, Inc. New York, col. 8, No. 4, pp. 62–75 XP002912523 ISSN: 0272–1732.

* cited by examiner

Primary Examiner—Ajit Patel
Assistant Examiner—Chirag Shah
(74) Attorney, Agent, or Firm—Sughrue Mion, PLLC

(57) ABSTRACT

The invention relates to a method of resolving collisions between at a receiver, and also to such a receiver. According to the invention, the method performed by the receiver processes the signal representative of a collision. The method consists in particular in selecting signal "fingers" having a power level greater than a threshold value, and in combining said fingers with one another to find configurations for which the packets that result from the combination are error-free, thereby enabling the transmitters from which the colliding packets originated to be identified.

9 Claims, 3 Drawing Sheets

METHOD OF RESOLVING PHYSICAL LAYER COLLISIONS IN A RANDOM ACCESS PROTOCOL AN A CORRESPONDING RECEIVER

BACKGROUND OF THE INVENTION

The field of the invention is that of detecting and resolving collisions between packets in a system where a plurality of transmitters transmit data packets to a receiver by means of a random access protocol, for example by radio.

In the description below, the term "collision" is used to designate a receiver receiving at least two packets whose contents are superposed at least in part and that come from transmitters for which no indication makes it possible to distinguish between them at the receiver. Collision is detected by a conventional collision detection method: each packet transmitted by a transmitter includes not only a field of information bits, but also a field containing redundancy bits calculated on the basis of the information bits by means of a predefined algorithm. By way of example, the redundancy bits can be calculated on the basis of using a parity bit, a Hamming code, or a cyclic redundancy code (CRC), where use of a CRC is the most widespread. When a packet is received, the receiver calculates the redundancy bits on the basis of the information bits it has received and using the same algorithm as that which was used by the transmitter of the packet. If the comparison shows a match between the redundancy bits as received and as recalculated, then the packet is deemed to have been received without error, otherwise the packet is erroneous, and the error is assumed to be due to a collision.

The signal corresponding to the collision is constituted by superposing at least two packets, at least in part. Nevertheless, for the purposes of calculating redundancy bits, the receiver treats such superposition of packets as a single packet which is referred to below as the "resulting" packet, in which the information bit field and the redundancy bit field are defined as though only one packet was involved. The signal level of the bits in the resulting packet is the sum of the signal levels of the corresponding bits in the packets that have collided.

In the state of the art, the receiver does no more than detect that collision has taken place and it ignores the contents of the packets that have collided. Collision resolution is the subject of a communications protocol between the transmitter and the receiver.

An example of such a protocol is constituted by the Aloha protocol. On transmitting each packet, the transmitter starts a timer which it stops on receiving an acknowledgment for that packet from the receiver. If the acknowledgment has not been received when the timer times out, that means a collision might have happened, and the transmitter automatically retransmits the same packet after a random length of time has elapsed.

Such a communications protocol is generally implemented in a radio network while a mobile terminal is requesting connection to the network. At that moment, the mobile terminal still does not have a dedicated channel and it must access the network by means of a channel that is shared by random access.

That solution suffers from the drawback of generating a high overall level of interference in the network due to the numerous unsuccessful attempts at connection. Also, the mechanism whereby packets that have collided are repeated increases the time required to establish a connection.

SUMMARY OF THE INVENTION

A particular object of the present invention is to provide a method of resolving collisions that makes it possible to avoid retransmitting packets that have collided.

Another object of the invention is to accelerate connection when it relies on a random access protocol to a shared channel.

Another object of the invention is to provide a receiver that implements the method.

These objects, and others that appear below, are achieved by a method of resolving collisions between packets transmitted to a receiver by different transmitters using a random access protocol, a signal corresponding to said packets colliding being received at the receiver, the method including a step of detecting errors and a step of identifying the transmitter of a packet, the method further comprising the steps of: selecting the fingers of the receive signal that have a power level greater than a threshold level; searching for a first configuration of contributions from the fingers for which the resulting packet is error-free, and identifying the corresponding transmitter, referred to as the first transmitter; and searching for a second configuration of contributions from the fingers for which the resulting packet is error-free, and for which the identified transmitter is different from the first transmitter. The inventive method may also involve the transmitting of an acknowledgement to each identified transmitter.

The step of detecting errors may be based on a CRC check for each of the resulting packets. In addition, the search for the first configuration may comprise the steps of: selecting the received signal finger having the highest power level; and searching for the minimum configuration of contributions from fingers for which the resulting packet is error-free; and the method of the invention may then further comprise the excluding of the fingers constituting the minimum configuration from the search for the second configuration.

The inventive method may be used in a CDMA type cellular network during the stage in which connection messages are interchanged between a terminal and a base station, a collision occurring when the base station receives connection messages from at least two terminals using different preambles within a predetermined period of time.

According to a further aspect of the invention, there is provided a receiver for receiving packets transmitted by different transmitters using a random access protocol, the receiver comprising means (14) for detecting the presence of errors in a packet, and means (15) for identifying the transmitter of a packet that has been correctly received, the receiver also comprising means for resolving collisions between packets. The means for resolving collisions may comprise: means (11) for storing the signal received in a predetermined period of time; means (12) for selecting from the received signal fingers having a power level greater than a threshold value; and means (13) for combining contributions from the fingers, followed by the means (14) for detecting the presence of errors, and the means (15) for identifying the transmitter.

According to the invention, the means (14) for detecting the presence of errors may comprise a CRC check for each of the resulting packets. Further, the receiver may have means for transmitting an acknowledgement to each of the identified transmitters.

Advantageously, an acknowledgment can usually be generated directly by the receiver, thereby avoiding the need for packets that have collided to be repeated.

BRIEF DESCRIPTION OF THE DRAWINGS

Other characteristics and advantages of the invention will appear on reading the following description of a preferred implementation given by way of non-limiting illustration, and from the accompanying drawings, in which.

DETAILED DESCRIPTION OF THE INVENTION

To enable the remainder of the present description to be understood, it is appropriate at this point to introduce a concept. A receiver of the so-called "rake" type is characterized by the fact that it makes it possible, within a multiple signal made up of a superposition of a plurality of "unit" signals, all carrying the same payload signal, but each subject to a different delay, to detect the beginning of each of the unit signals. The unit signals are then combined so as to obtain a result signal for which the signal-to-noise ratio is optimized. The beginnings of the unit signals are identified by the presence in each unit signal of the same sequence of "pilot" bits. An example of a multiple signal made up of unit signals and applicable to the case of transmission by radio, is given by the superposition of a direct signal path and of secondary paths that are attenuated and delayed, and that are due to multiple path propagation. By applying the multiple signal to a correlator that correlates the multiple signal with the sequence of pilot bits, it is possible to generate a signal representative of power in which the peaks at certain instants indicate that correlation is successful and thus that the searched-for sequence of bits is present. The various correlation peaks are referred to as the "fingers" of the signal. The amplitude of a peak is proportional to the level corresponding to the payload signal. A threshold value is thus defined so as to select only those peaks of power situated above said threshold level. As a general rule, the value chosen for the threshold depends on the level of noise and of interference observed in the received signal.

Figure 1:
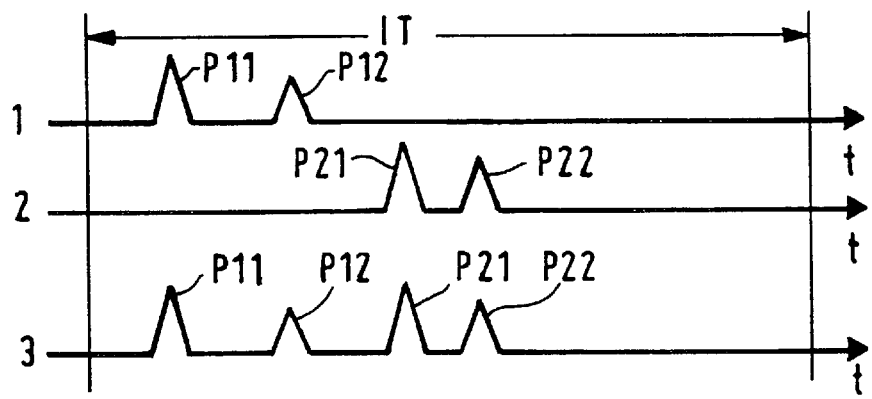
FIG. 1 shows a channel profile corresponding to a collision between packets.

FIG. 1 shows a channel profile corresponding to a collision between packets. The three time axes 1, 2, and 3 have the same time origin. On the three time axes 1, 2, and 3, there is marked the duration of a time slot IT during which the receiver can detect a collision.

Time axis 1 represents reception of a first packet during time slot IT; peak P11 represents correlation with the sequence of pilot bits between the signal corresponding to the direct path for a first packet, while peak P12 represents the correlation with the sequence of pilot bits for a signal corresponding to a delayed path for the first packet.

Time axis 2 represents reception of a second packet during time slot IT; peak P21 represents correlation with the sequence of pilot bits for the signal corresponding to the direct path of a second packet, while peak P22 represents correlation with the sequence of pilot bits for a signal corresponding to a delayed path of the second packet.

Time axis 3 represents the superposition of time axes 1 and 2 during the time slot IT, and thus represents the channel profile as received by the receiver.

The method of the invention as implemented in a receiver of the invention seeks to process the contents of the signal representing a collision between a plurality of packets by selecting the fingers of the received signal that have power levels above a threshold value. These fingers are then combined in various ways to detect the configurations for which the resulting packets are error-free and for which it is possible to determine the various transmitters from which the colliding packets originate.

Figure 2:
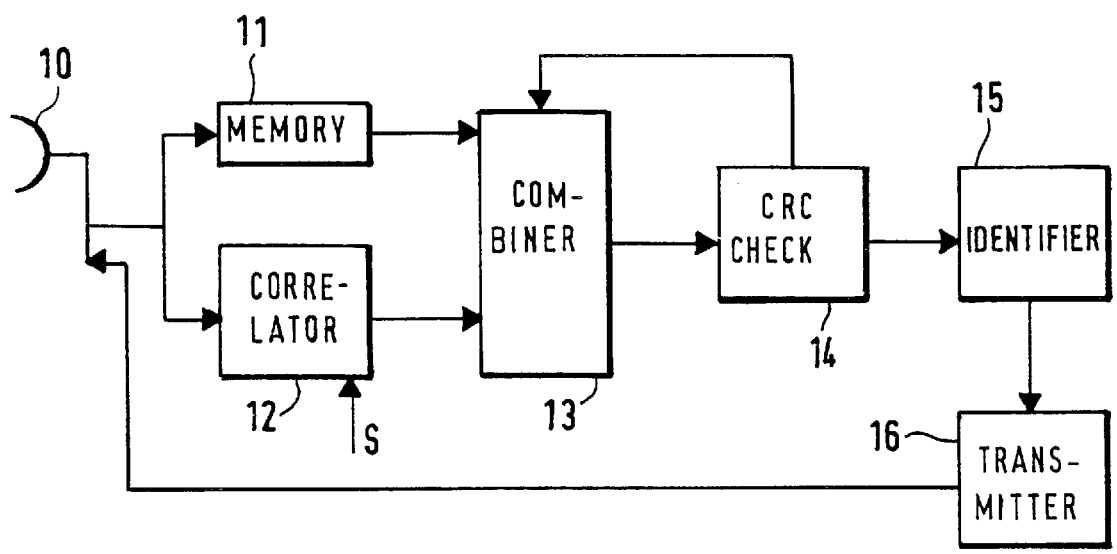
FIG. 2 is a block diagram of an embodiment of a receiver of the invention.

FIG. 2 is a block diagram of an embodiment of a receiver of the invention.

This receiver is designed to be installed in a base station of a CDMA type transmission network, for the purpose of resolving collisions between information packets coming from various terminals of the CDMA network. Such a receiver serves to maintain a low level of interference which is crucial for the CDMA network to be effective, so as to avoid repeating packets that have collided.

An information packet comprises a preamble and a message portion. The preamble is characteristic of the spreading sequence allocated to the terminal that transmits the packet. The terminals transmit packets of information to the base station using a random access protocol on a communications channel that is divided into time slots and that is shared between all of the terminals. Random access is controlled so that each packet is received by the base station within one time slot. The duration of a time slot is longer than the duration of a packet. There is no collision when only one packet is received in a time slot or when the packets coming from stations using different spreading sequences are received in the same time slot. A collision occurs when a base station receives packets in the same time slot that come from at least two stations using the same spreading sequence, in which case the packets have the same preamble.

The receiver has a receive antenna 10 which forwards the received signal to a memory 11 and to a correlator 12. The memory 11 stores the signal contained within a time slot and the correlator 12 makes it possible to select the fingers in the received signal that are of a power level that is greater than a threshold level S. The memory 11 and the correlator 12 are connected to combiner means 13 enabling the contributions of the fingers of the signal to be combined with one another. The combiner means 13 provide the signal obtained by a combination to CRC check means 14 acting on the combiner means 13. The CRC check means 14 is connected to transmitter identifier means 15 itself connected to means 16 for transmitting an acknowledgment of the identified transmitter, The correlator 12 is designed to search in the received signal for the presence of a preamble constituted by a known sequence of pilot bits, and to specify the power with which the preamble appears in the received signal. The correlator 12 gives a response that has a peak corresponding to the direct path, and other peaks of smaller amplitude corresponding to secondary paths that are delayed relative to the direct path.

Specifically, in the event of a collision between two packets having the same preamble, the correlator will present two peaks that correspond to the main paths of the two packets. The spacing between these two peaks depends on the distance of the transmitters from the base stations, and the greater the difference in distance, the greater the spacing between the peaks. The output signal from the correlator 12 makes it possible to detect the various fingers of the signal that have power greater than the threshold value S. The presence of a peak output from the correlator 12 with power greater than the threshold value indicates that a primary or a secondary path is present from a transmitter that is using the sequence of pilot bits being searched for by the correlator 12. The position of a peak within the time slot under consideration makes it possible to determine the travel time compared with the beginning of the time slot. Each signal finger is associated by the correlator 12 with a delay and with a power level.

The purpose of the combiner means 13 is to take account only of the contributions from suitably chosen fingers, for the purpose of optimally reconstituting the various packets that have collided.

Thus, in some cases, selecting a single finger having the greatest power level will achieve sufficient signal contribution to enable a packet to be reconstituted. In other cases, it is only by combining this finger having the highest power level with other fingers that correspond to multiple paths of the same packet that it becomes possible to reassemble sufficient signals to be able to reconstitute the packet.

Figure 3:
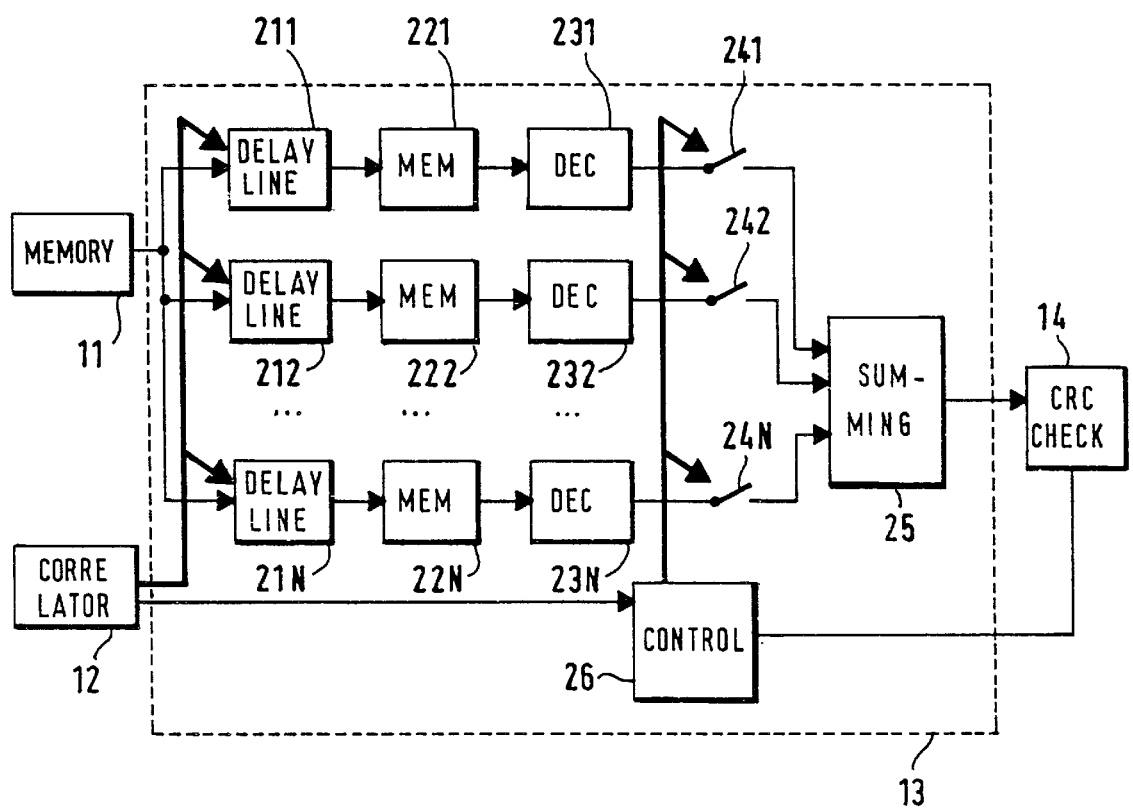
FIG. 3 is a block diagram of an embodiment of the means responsible for the various combinations that enable the various transmitters to be determined.

FIG. 3 shows the structure of the combiner means 13. At its input, the combiner means 13 makes use of the indications of the various delays of the signal fingers selected by the correlator 12, and also of the contents of the time slot as stored in the memory 11. The combiner means have N delay lines 211, 212 , 21N, each of which is followed by a respective memory 221, 222, . . . , 22N, where N is the number of signal fingers selected by the correlator 12. The delay imparted by a delay line corresponds to one of the delays given at the output from the correlator 12 and characterizes a signal finger. The shortest delay corresponds to the delay line 211 and the longest delay to the delay line 21N. The content of a memory connected to a delay line corresponds to the content of the signal stored in the memory 11, and delayed by the delay associated with the delay line. Each memory 221, 222, 22N is followed by decoder means 231, 232, . . . , 23N for decoding the signal contained in the corresponding memory. Each of the means 231, 232, 23N corresponds to a signal unspreading entity which uses the spreading sequence associated with the signal, and to a channel estimator entity enabling the unspread signal to be weighted. The decoder means 231, 232, 23N are respectively connected via switches 241, 242, . . . , 24N to summing means 25. The switches 241, 242, . . . , 24N enable the contribution coming from any one of the N parallel paths to be associated or not associated with the summing. The summing means 25 is connected to the CRC check means 14.

The switches are opened or closed under the control of control means 26 making use of the results received from the CRC check means 14, and also of the relative powers of the various fingers obtained by the correlator 12.

The control means 26 preferably has a set of memorized combinations each corresponding to a particular configuration of positions for the various switches 241 to 24 N. The various combinations under the control of the control means 26 are applied successively in time. The result obtained at the CRC check means 14 makes it possible via the control means 26 to determine the next combination to be applied.

From the summing means 25, the CRC check means 14 receives a signal that the CRC check means 14 treats as an information packet having the same structure as a single packet. The CRC check means 14 determines whether or not the packet that results from the activated contribution presents any errors. If a resulting packet does not present any errors, then the packet is submitted to the transmitter identification means 15 shown in FIG. 2 which can identify the transmitter of a packet that has been involved in a collision. Every transmitted packet preferably includes within its information field, a field containing the reference of its transmitter. The means 15 extracts the reference of the transmitter from this field.

If a channel encoding means is used in the communications system, the decoding means (not shown in the figures) is preferably situated between the combiner means 13 and the CRC check means 14 shown in FIG. 2. The combiner means 13 delivers "soft" bits, i.e. bits in the form of signal levels, to the decoder means which in turn delivers "hard" bits, i.e. bits in the form of "0" or "1", to the CRC check means 14.

Figure 4:
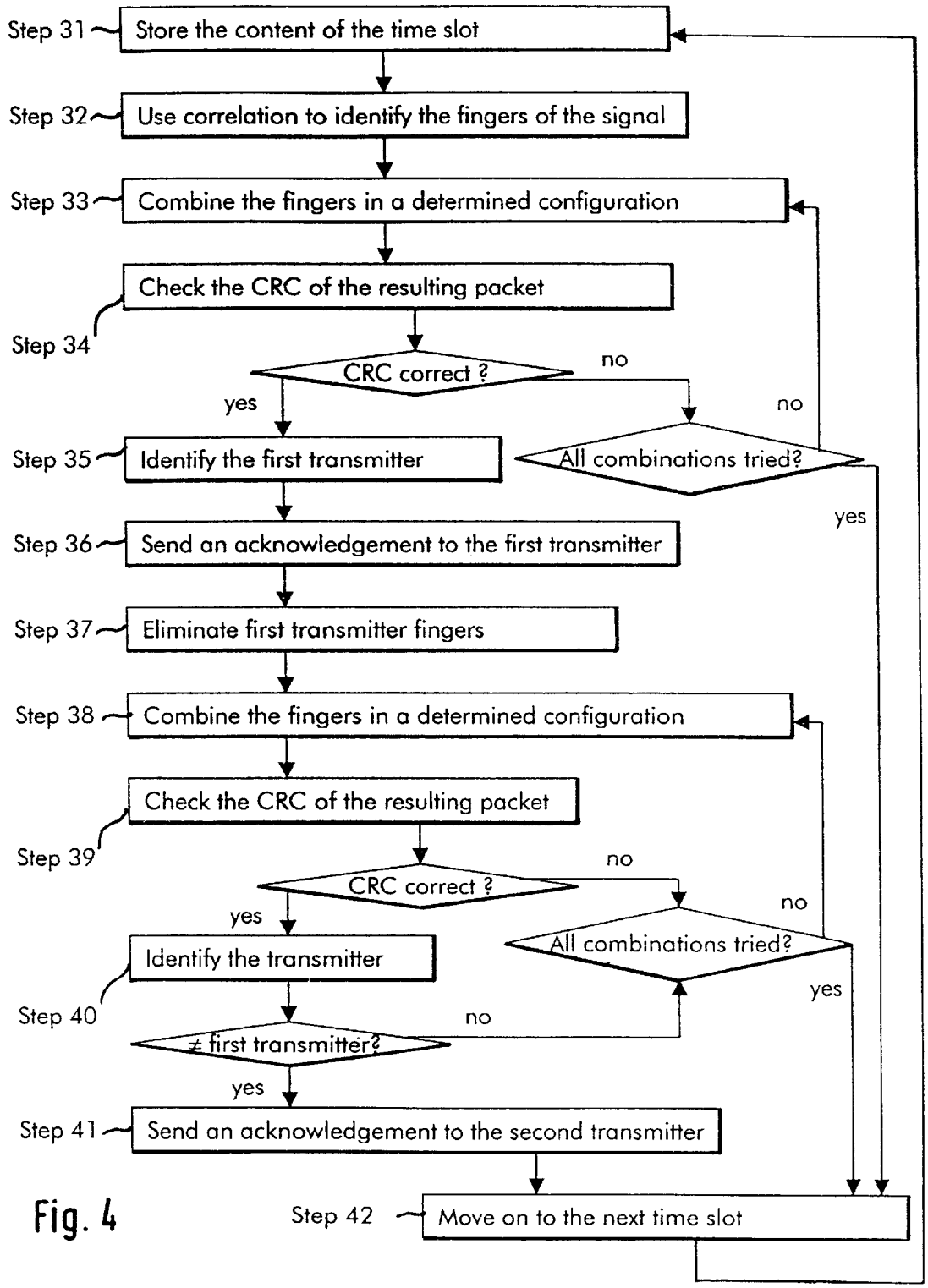
FIG. 4 is a flow chart showing how an implementation of the method of the invention proceeds.

An implementation of the method of the invention is shown in the form of the flow chart of FIG. 4.

The error detector means used is based on a CRC check. The method comprises the following steps.

Step 31: the signal received during a time slot is stored. The time slot preferably corresponds to the duration of a time slot in crenellated Aloha. If pure Aloha is used, then the time slot is selected so that it contains a collision.

Step 32: the fingers of the signal having power greater than a threshold value are identified. For each finger, its delay relative to the beginning of the time slot and the power of its correlation peak are determined.

Step 33: the fingers are combined to obtain a resulting packet.

Step 34: the CRC of the resulting packet is checked. If the CRC is correct, the method moves on to step 35, otherwise it moves back to step 33 if all possible combinations have not been tried. If all combinations have been tried, then the method moves on to step 42.

Step 35: the first transmitter is identified.

Step 36: an acknowledgment is sent to the first transmitter.

Step 37: fingers that have contributed to the minimum combination giving a correct CRC are eliminated.

Step 38: fingers are combined and a resulting packet is obtained.

Step 39: the CRC of the resulting packet is checked. If the CRC is correct, the method moves on to step 40, otherwise it moves back to step 38 if all possible combinations have not been tried. If they have all been tried, then the method moves on to step 42.

Step 40: transmitter identification, if the transmitter is different from the first transmitter the method moves on to step 41, otherwise it moves back to step 38 if all possible combinations have not been tried. If they have been tried, it moves on to step 42.

Step 41: an acknowledgment is sent to the second transmitter.

Step 42: move on to the following time slot and thus return to step 31.

The procedure for combining fingers in step 33 preferably proceeds in such a manner that the first combination is made up solely of the contribution from the finger having the highest power level, referred to as the "main" finger. On each new call to the procedure by the control means 26, the contribution of another finger is added to the combination so that all two-finger combinations including the main finger are submitted, and then all three-finger combinations including the main finger, and so on until a first combination is found that leads to a correct CRC. This combination represents the minimum combination that enables a correct CRC to be obtained, i.e. all of the fingers making it up necessarily come from the same transmitter. As a result, the search for an additional transmitter can be implemented by eliminating the fingers of the first combination from the search. Step 38 is derived from step 33 by eliminating all of the fingers that have contributed to identifying the first configuration from the fingers being combined.

Another method of combining fingers consists in trying all possible combinations of the various fingers; there exist $$\sum_{k=1}^{n} C_N^k$$

possible combinations for N selected fingers. The transmitter of a resulting packet that leads to a correct CRC is compared with the transmitters that have already been identified and is added to the list only if it is not already part of it. An acknowledgment is sent to each distinct identified transmitter.

The method described by steps 31 to 42 is preferably content to search for only two different transmitters, thereby covering the majority of collisions, given that the probability of three or more transmitters having identical preambles all transmitting packets that come into collision is very small. Nevertheless, the method can be extended to searching for more than two transmitters whose packets have collided, with the search for an additional transmitter being implemented by eliminating all of the fingers that have already led to a transmitter being identified from the set of fingers being used for combination purposes.

It is possible that under unfavorable conditions, the method described does not enable any combination of fingers to be discovered that leads to a correct CRC, or that it enables only one such combination to be found. Such unfavorable conditions may be due to an excessive level of noise or to fingers being superposed that correspond to packets coming from different transmitters, which cannot be dealt with by the method. Under such circumstances, the communications protocol described in the state of the art and relying on activating a timer remains a reliable means for resolving the collision. That is why the method of the invention is preferably applied in addition to, but not as a replacement for, the method described in the prior art.

What is claimed is:

1. A method of resolving collisions between packets transmitted to a receiver by different transmitters using a random access protocol, wherein a signal corresponding to at least two of said packets from different transmitters colliding is received at said receiver, the method comprising:

selecting fingers of said signal that have a power level greater than a threshold level;

searching for a first configuration of contributions from said fingers for which a resulting packet from said first configuration is error-free, and identifying a corresponding transmitter which transmitted the resulting packet from said first configuration; and searching for a second configuration of contributions from said fingers for which a resulting packet from said second configuration is error-free, and identifying a corresponding transmitter which transmitted the resulting from said second configuration and is different from said transmitter which transmitted the resulting packet from said first configuration, said second configuration excluding contributions from said fingers of said first configuration.

2. A method according to claim 1, wherein said steps of searching for said first configuration and said second configuration each comprise determining whether said resulting packets are error-free by detecting errors based on a CRC check.

3. A method according to claim 1, further comprising transmitting an acknowledgement to each identified transmitter.

4. A method according to claim 1, wherein said step of searching for the first configuration comprises:

selecting a received signal finger having the highest power level; and searching for a minimum configuration of contributions from fingers for which the resulting packet is error-free; and wherein said second configuration excludes the fingers of said minimum configuration.

5. A method according to claim 1, wherein the method is used in a CDMA type cellular network during a stage in which connection messages are interchanged between a terminal and a base station, a collision occurring when said base station receives connection messages from at least two terminals using different preambles within a predetermined period of time.

6. A receiver for receiving packets transmitted by different transmitters using a random access protocol, said receiver comprising:

means for determining from a received signal fingers having a power level greater than a threshold value, said received signal corresponding to at least two said packets from said different transmitters colliding;

means for searching for a first configuration of contributions from said fingers for which a resulting packet from said first configuration is error-free and a second configuration of contributions from said fingers for which the resulting packet from said second configuration is error-free, wherein said second configuration excludes contributions from said fingers of said first configuration;

means for identifying a first transmitter which transmitted the resulting packet from said first configuration and a second transmitter which transmitted the resulting packet from said second configuration, wherein said second transmitter is different from said first transmitter.

7. A receiver according to claim 6, wherein said means for searching comprises:

means for combining contributions from said fingers; and means for detecting the presence of errors in a packet.

8. A receiver according to claim 6, wherein said means for detecting the presence of errors comprises a CRC check for each of said resulting packets.

9. A receiver according to claim 6, wherein said receiver further comprises means for transmitting an acknowledgement to each of said identified transmitters.

* * * * *